April 6, 1926.  1,579,675
D. C. THOMAS
DUMPING TRUCK BODY
Filed Jan. 21, 1924
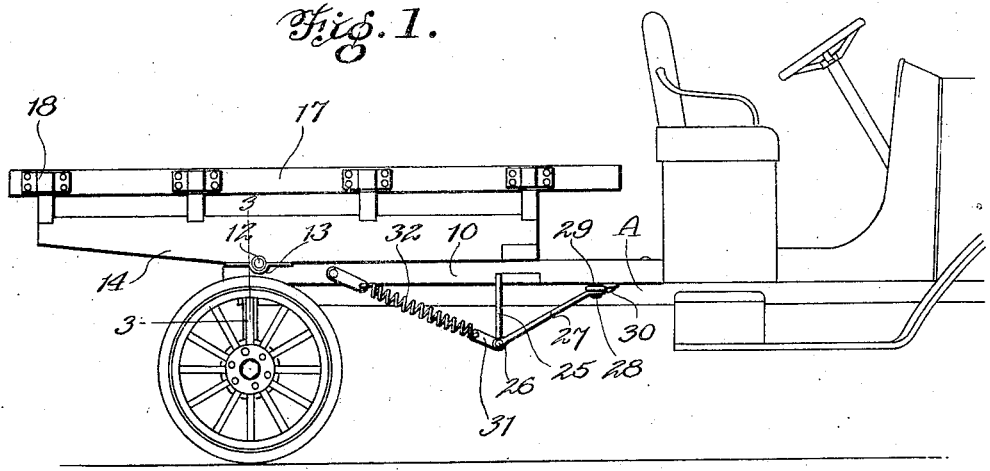
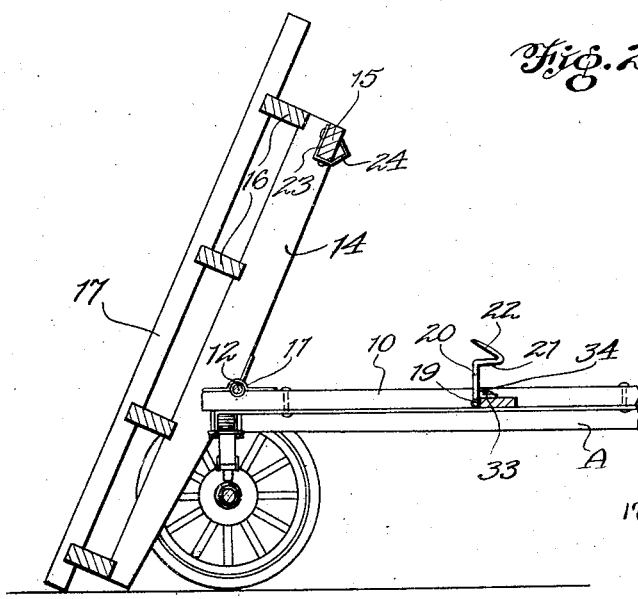
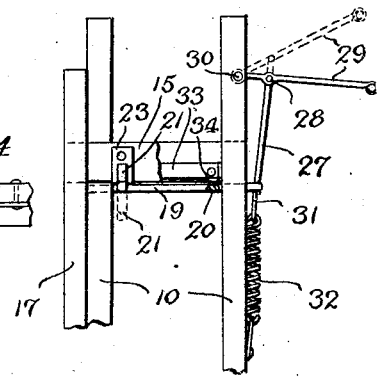
Doctor Cortez Thomas
INVENTOR
BY Victor J. Evans
ATTORNEY
WITNESS:

Patented Apr. 6, 1926.

1,579,675

UNITED STATES PATENT OFFICE.

DOCTOR C. THOMAS, OF ABERDEEN, NORTH CAROLINA.

DUMPING-TRUCK BODY.

Application filed January 21, 1924. Serial No. 687,600.

*To all whom it may concern:*

Be it known that I, DOCTOR C. THOMAS, a citizen of the United States, residing at Aberdeen, in the county of Moore and State of North Carolina, have invented new and useful Improvements in Dumping-Truck Bodies, of which the following is a specification.

This invention relates to vehicles and has for its object the provision of a novel dumping truck body designed particularly for use in connection with the chassis of an automobile, the body being so mounted that it will tilt rearwardly for discharging its contents upon disengagement of holding means.

An important and more specific object is the provision of a dumping truck body equipped with novel means for normally holding the body in its operative position, lever means being provided for releasing the holding means, the holding means being furthermore of such a nature that the body will be automatically latched when it is simply returned to normal position after dumping.

Another object is the provision of a release lever which is operated by forward movement thereof, a feature which prevents accidental tripping of the body in case the lever strikes against something while the vehicle is traveling.

An additional object is the provision of a device of this character which will be simple and inexpensive in manufacture, easy to operate, positive is action, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the device showing it mounted upon an automobile chassis, Figure 2 is a vertical section showing the body in dumped position, Figure 3 is a plan view of the forward portion, The remaining figures are detail views.

Referring more particularly to the drawings the numeral 10 designates sills of any suitable construction designed to be mounted upon the chassis A of a motor vehicle, any desired means being provided for effecting this mounting. Secured upon the top of the rear ends of the sills are bearings 11 for a transverse shaft 12 which passes through bearings 13 on the undersides of longitudinal bars 14 which form the base of the movable body. The movable body is here represented as equipped at its forward end with a cross bar 15 and connected at various points by transverse members 16 which are in turn connected by upper longitudinal bars 17. Any type of body may be used, depending upon the nature of the work to be done, and the particular style shown is provided at its sides with sockets 18 for the reception of stakes not shown, though it should be understood that there is no limitation whatever in this respect.

Journaled transversely through the sills 10 immediately back of the cross bar 15 is a rock shaft 19 formed with upwardly extending latch arms 20 which have angular or hook like ends defining shoulders 21 and inclined surfaces 22 leading thereto. Ordinarily the shoulders 21 engage over the cross bar 15 for the purpose of holding the movable body against swinging. In case of a wooden body construction, it is highly desirable that the cross bar 15 be shod with metallic wear plates 23 at the points engaged by the latch hooks, these wear plates extending downwardly beyond the bottom surface of the cross bar 15 and having inclined surfaces 24 co-operating with the inclined surfaces 22 of the hooks for moving the hooks out of the way and permitting latching when the body is returned to normal position after dumping.

One end of the rock shaft is formed with a depending arm 25 to which is connected, by a pivot 26, a forwardly extending link 27 which is in turn pivoted at 28 on an actuating lever 29 suitably pivoted on the adjacent sill 10 as shown at 30. Connected by the pivot 26 at the juncture of the arm 25 and link 27 is a rearwardly extending plate member 31 to which is connected one end of a coil spring 32 which has its other end suitably connected with the sill.

As the spring pulling upon the arm 25 urges the hooks or latches forwardly, it is apparent that some means must be provided for limiting their forward movement and this is taken care of by providing an elongated plate 33 which is secured on the top of the cross bar 15 and which has its rear edge formed near its ends with upstanding lugs 34 against which the shank portions of the hooks or latches abut.

Ordinarily the movable body is located immediately on top of the sills, the underside of the front cross member 15 bearing upon the sills and the shoulders 21 of the hooks or latches engaging above the cross member 15. To release the body, it is necessary to pull forwardly upon the lever 29 so as to rock the shaft 19 to a sufficient extent that the hooks or latches will be moved rearwardly out of obstructing relation to the cross bar 15. The body may then tilt for dumping the load. When returning the body to normal position it is not necessary to move the lever 29 forwardly, for the reason that the inclined surfaces 24 will engage the inclined surfaces 22 of the hooks and exert a wedging or camming action which will result in rocking the shaft 19 against the resistance of the spring to a sufficient extent that the cross member may slip over the hooks and seat itself upon the sills. It will be observed that as the releasing lever must be moved forwardly to release the body, there is no danger of the body being accidentally released by striking of the lever against some object while the vehicle is traveling.

While I have shown and described the preferred embodiment of my invention it is of course to be understood that I reserve the right to make such changes in the form, construction and arrangement of parts as will not depart from the spirit of the invention or the scope of the subjoined claim.

Having thus described my invention I claim:

In a dumping truck, the combination of a supporting frame work, a dump body pivoted thereon to swing vertically, and latch mechanism comprising vertical latch carrying arms, a horizontal rock shaft carrying said arms, a horizontally movable operating lever pivoted to the supporting frame, a link extending rearwardly from said operating lever and connected with said rock shaft, and a spring device connected with said rock shaft and extending rearward therefrom and connected with the supporting frame.

In testimony whereof I affix my signature.

DOCTOR C. THOMAS.